US011034593B2

(12) United States Patent
Park et al.

(10) Patent No.: US 11,034,593 B2
(45) Date of Patent: Jun. 15, 2021

(54) LIQUID DISPENSER

(71) Applicant: LG ELECTRONICS INC., Seoul (KR)

(72) Inventors: Jongwoo Park, Seoul (KR); Goeun Kim, Seoul (KR); Kwangyong An, Seoul (KR)

(73) Assignee: LG ELECTRONICS INC., Seoul (KR)

(*) Notice: Subject to any disclaimer, the term of this patent is extended or adjusted under 35 U.S.C. 154(b) by 235 days.

(21) Appl. No.: 16/401,542

(22) Filed: May 2, 2019

(65) Prior Publication Data
US 2019/0256372 A1 Aug. 22, 2019

Related U.S. Application Data

(63) Continuation of application No. 15/659,719, filed on Jul. 26, 2017, now Pat. No. 10,322,943.

(30) Foreign Application Priority Data

Jul. 26, 2016 (KR) .................. 10-2016-0094866

(51) Int. Cl.
*C02F 1/00* (2006.01)
*C02F 1/02* (2006.01)
(Continued)

(52) U.S. Cl.
CPC ............... *C02F 1/003* (2013.01); *C02F 1/02* (2013.01); *C02F 9/005* (2013.01); *B67D 3/0009* (2013.01);
(Continued)

(58) Field of Classification Search
CPC ........ B67D 3/0009; C02F 1/001; C02F 1/003; C02F 1/02; C02F 2201/002; C02F 2209/40; C02F 2307/10; C02F 9/005
See application file for complete search history.

(56) References Cited

U.S. PATENT DOCUMENTS 4,801,048 A  1/1989 Credle, Jr. et al.
2008/0210408 A1  9/2008 Sterngold et al.

FOREIGN PATENT DOCUMENTS

CN  203378967  1/2014
CN  103781728  5/2014
(Continued)

OTHER PUBLICATIONS

Chinese Office Action dated Apr. 26, 2019 issued in CN Application No. 201710506836.2.
(Continued)

*Primary Examiner* — Dirk R Bass
(74) *Attorney, Agent, or Firm* — Ked & Associates, LLP

(57) ABSTRACT

A water purifier according to an aspect includes: a cooling water tank that keeps cooling water; a cold water pipe provided in the cooling water tank; an evaporator provided in the cooling water tank; a separator on which the evaporator is provided and that is provided over the cold water pipe to divide the internal space of the cooling water tank into a first space and a second space; a stirring member that is provided in the cooling water tank and stirs the cooling water; a stirring motor that has a rotary shaft to which the stirring member is coupled; a stirring motor cap that covers the side and the top edge of the stirring motor; and a stirring motor support to which the stirring motor cap is fastened and that is provided at the top of the cooling water tank to seal the top of the cooling water tank.

10 Claims, 13 Drawing Sheets

(51) Int. Cl.
*C02F 9/00* (2006.01)
*B67D 3/00* (2006.01)

(52) U.S. Cl.
CPC ........ *C02F 1/001* (2013.01); *C02F 2201/002* (2013.01); *C02F 2209/40* (2013.01); *C02F 2307/10* (2013.01)

(56) References Cited

FOREIGN PATENT DOCUMENTS

| | | |
|---|---|---|
| CN | 205061593 | 3/2016 |
| CN | 105595845 | 5/2016 |
| JP | 2002-318049 | 10/2002 |
| JP | 4458497 | 4/2010 |
| JP | 2010-144967 | 7/2010 |
| KR | 10-0580371 | 5/2006 |
| KR | 10-2010-0078802 | 7/2010 |
| KR | 10-2011-0065979 | 6/2011 |
| KR | 10-1191420 | 10/2012 |
| KR | 10-2013-0041670 | 4/2013 |
| KR | 10-1383024 | 4/2014 |
| KR | 10-2015-0019118 | 2/2015 |

OTHER PUBLICATIONS

Chinese Office Action dated Apr. 26, 2019 issued in CN Application No. 201710512119.0.
Korean Office Action dated Jul. 26, 2017 issued in Application No. 10-2016-0090827.
Korean Office Action dated Jul. 26, 2017 issued in Application No. 10-2016-0090828.
Korean Notice of Allowance dated Nov. 1, 2017 issued in Application No. 10-2016-0090827.
Korean Notice of Allowance dated Nov. 24, 2017 issued in Application No. 10-2016-0090828.
Australian Office Action dated Jun. 19, 2018 issued in AU Application No. 2017206144.
Chinese Office Action dated Mar. 18, 2020 issued in CN Application No. 201710526057.9.

LIQUID DISPENSER

CROSS-REFERENCE TO RELATED APPLICATION(S)

This is a Continuation Application of prior U.S. application Ser. No. 15/659,719, filed Jul. 26, 2017, which claims priority to Korean Patent Application No. 10-2016-0094866 filed on Jul. 26, 2016 in Korea and the entire contents of each of which are hereby incorporated by reference in its entirety under Articles 119 (35) and 365 (35) of the U.S. Patent Law.

BACKGROUND

1. Field

The present disclosure relates to a water purifier, e.g., a liquid dispenser.

2. Background

A water purifier is a machine that filters harmful substances such as dirt or heavy metals in water using a physical and/or a chemical treatment. An example of a water purifier is described in Korean Patent Application Publication No. 10-2011-0065979 (published on Jun. 16, 2011). This water purifier includes a tank for holding water or other heat-exchanging fluid, and positions an evaporator and a cold water pipe within the tank. A refrigerant flows into the evaporator to cool the water within the tank through a first heat exchange, and the purified water in the cold water coil is cooled by a second heat exchange with the cooled water in the tank.

In this water purifier, a stirring member in the tank is operated to induce a water movement that accelerates the heat exchanges. The stirring member is rotated by a stirring motor coupled to a cover positioned over an open top of the tank. The stirring motor is fastened to the cover by screws or other connectors. When the stirring motor is rotated, vibrations from the stirring motor are transmitted through the screws to other portions of the water purify, thereby generating noise. Furthermore, vibrations may cause the screws to loosen over time.

The above reference is incorporated by reference herein where appropriate for appropriate teachings of additional or alternative details, features and/or technical background.

BRIEF DESCRIPTION OF THE DRAWINGS

The embodiments will be described in detail with reference to the following drawings in which like reference numerals refer to like elements wherein.

DETAILED DESCRIPTION

A water purifier according to an embodiment of the present disclosure is described hereafter in detail with reference to the drawings.

Figure 1:
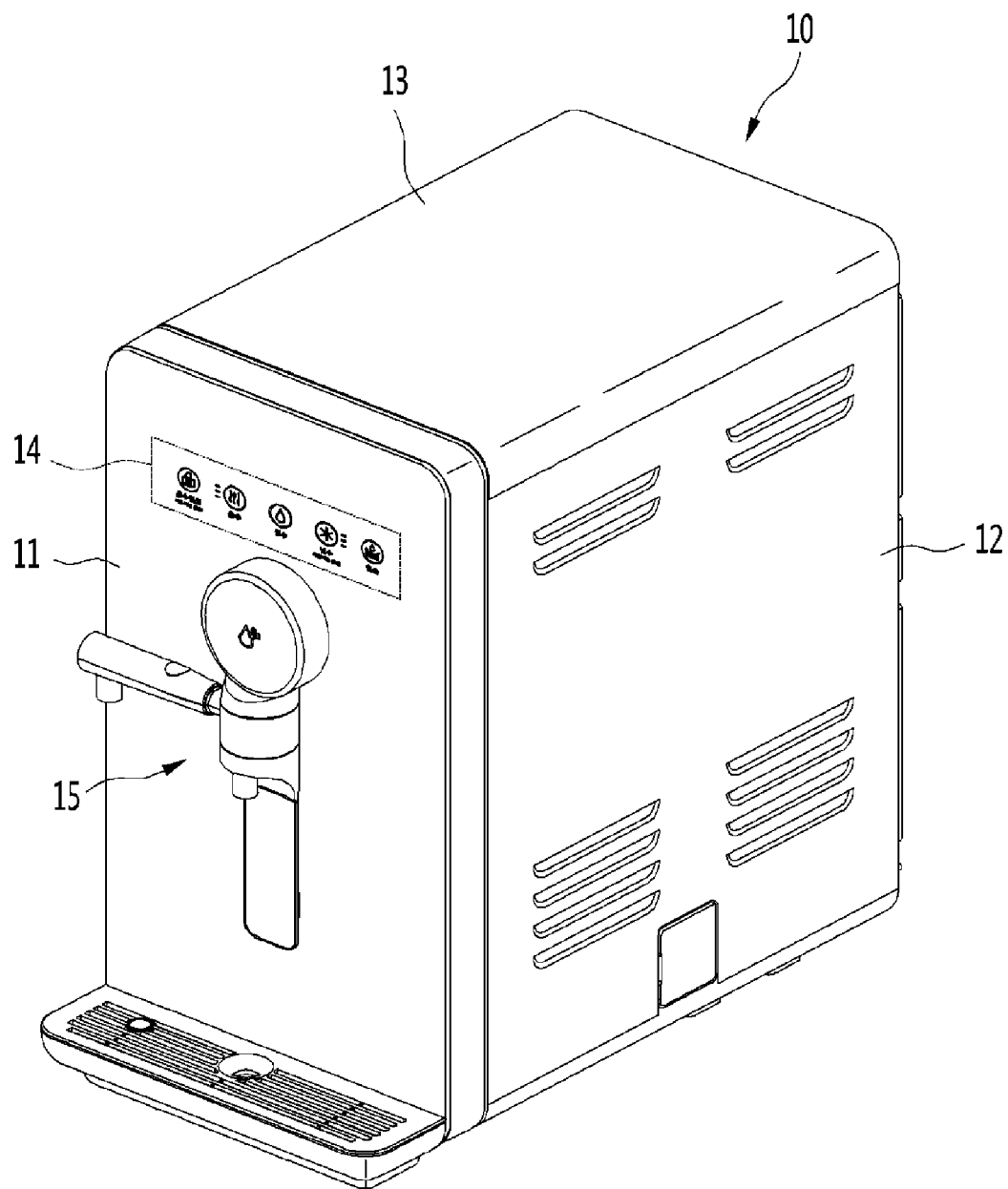
FIG. 1 is a perspective view of a water purifier according to an embodiment of the present disclosure.

FIG. 1 is a perspective view of a water purifier according to an embodiment of the present disclosure. Referring to FIG. 1, a water purifier 10 according to an embodiment of the present disclosure may be a direct hot and cold water purifier that selectively dispenses cold water or hot water. For example, the 10 may purify (or filter) water received from an external water source and may then heat or cool the purified water. As used herein, a "direct water purifier" is a water purifier that directly dispenses purified water to a user without storing the purified water within a tank. The direct water purifier may include a tank for holding other fluids, such as water that is used to cool the purified water.

An external shape or appearance of the water purifier 10 may be formed by combining a plurality of panels. In detail, the water purifier 10 may have a substantially cube or rectangular shape formed by combining a front panel 11 for a front surface, side (or lateral) panels 12 for side surfaces, a top panel 13 for a top surface, a rear panel for a rear surface, and a base (or bottom) panel for the bottom surface. Various parts for purifying water may be provided in an internal space defined by combining the panels.

An operation display unit (or user interface) 14 that allows a user to input instructions for operating the water purifier 10 and displays information regarding operation states of the water purifier 10 may be provided on the front panel 11. The operation display unit 14 may include one or more buttons and may selectively emit light through the buttons. For example, when a user presses, touches, or otherwise selects a button of the operation display unit 14, light is emitted to the selected button so that a user can easily recognizes that the selected button, and a function associated with the selected button is performed. In another example, the operation display unit 14 may include a touch screen to display information, such as a graphical user interface, and to detect a touch or other user input related to the displayed information.

In one implementation, the operation display unit 14 may include buttons for selecting the attributes for dispensed water, such as selecting a desired temperature for the dispensed water. For instance, the operation display unit 14 may include buttons for "cold" water (e.g., water cooled below a first prescribed temperature), "hot" water (e.g., water heated above a second prescribed temperature), or room-temperature water (e.g., water that is neither heated nor cooled). Furthermore, the operation display unit 14 may include a button indicating whether a hot water mode has been turned on or off, and the operation display unit 14 may display temperatures of the hot water and the cold water. In another example, the operation display unit 14 may include buttons for displaying certain quantities of the purified water to be dispensed, such as a first button for dispensing a first quantity of purified water and a second button for continuously dispensing purified water. It should be appreciated that the operation display unit 14 may exclude some of these buttons and/or may include other buttons for performing other functions, such as a button to provide ice or other liquid.

The water purifier 10 may further include a water chute (or tube) 15 under the operation display unit 14. The water chute 15 is operated by a user to cause the purified water to be dispensed. The water chute 15 opens/closes to selectively dispense purified water to the user, and water chute 15 may also be referred to as an opening/closing part or an opening/closing nozzle. For example, the operation of the water chute 15 may be controlled by one or more buttons in the operation display unit 14 to dispense purified room-temperature water, cold water, or hot water.

A tray for collecting water dropping from the water chute 15 may be provided at the lower end of the front of the front panel 11. The tray may be formed with a shape defining an internal space or cavity to receive dripping water and may have a grill-shaped cover on the top for filtering foreign substances. The tray may be moved with respect to the front panel 11 or removed altogether to allow a user to receive purified water in water bottles or other containers having heights that exceed a predetermined distance between the water chute 15 and the tray or in containers having wide bottoms. In one example, the tray may include a float or other visual indicator showing a level of water within the tray, so a user can recognize when to empty waste water collected in the tray.

Although not shown in the figures, several components including a cooling cycle for cooling water and a cold water production unit for producing cold water are provided inside the panels forming the external shape of the water purifier 10. In detail, the water purifier 10 may include one or more of a compressor that compresses a refrigerant into a high-temperature and high-pressure gaseous refrigerant, a condenser that condenses the refrigerant from the compressor into a high-temperature and high-pressure liquid refrigerant, and a condenser fan for heat exchange with the condenser. The water purifier 10 may further include an expansion valve that expands the refrigerant from the condenser into a low-temperature and low-pressure 2-phase refrigerant, and an evaporator (to be described below) to which the low-temperature and low-pressure 2-phase refrigerant flows after passing through the expansion valve.

The water purifier 10 may also include a cold water production unit (or cooler), and as described below, the cold water production unit may include the evaporator and a cold water pipe or coil through which filtered water flows. The water purifier 10 may further include a heater for heating supplied water to a set temperature. The water purifier 10 may further include a filter assembly that filters foreign substances or chemically treats the water to purify water received from an external water supplier. The filter assembly may include, for example, one or more of a fine physical barrier or a chemical process (e.g., carbon module) filter.

Figure 2:
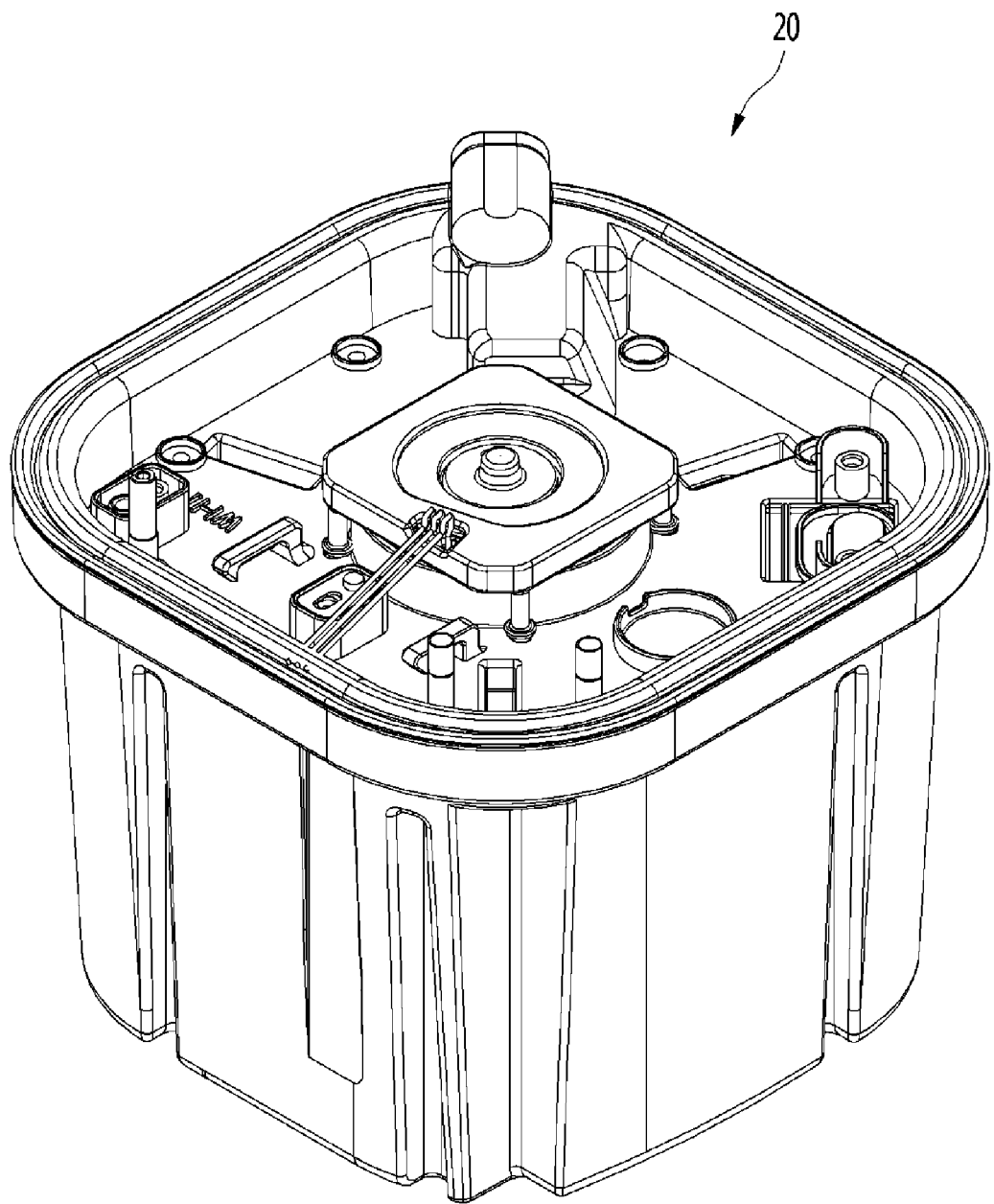
FIG. 2 is a perspective view of a cold water production unit of the water purifier according to an embodiment of the present disclosure.
Figure 3:
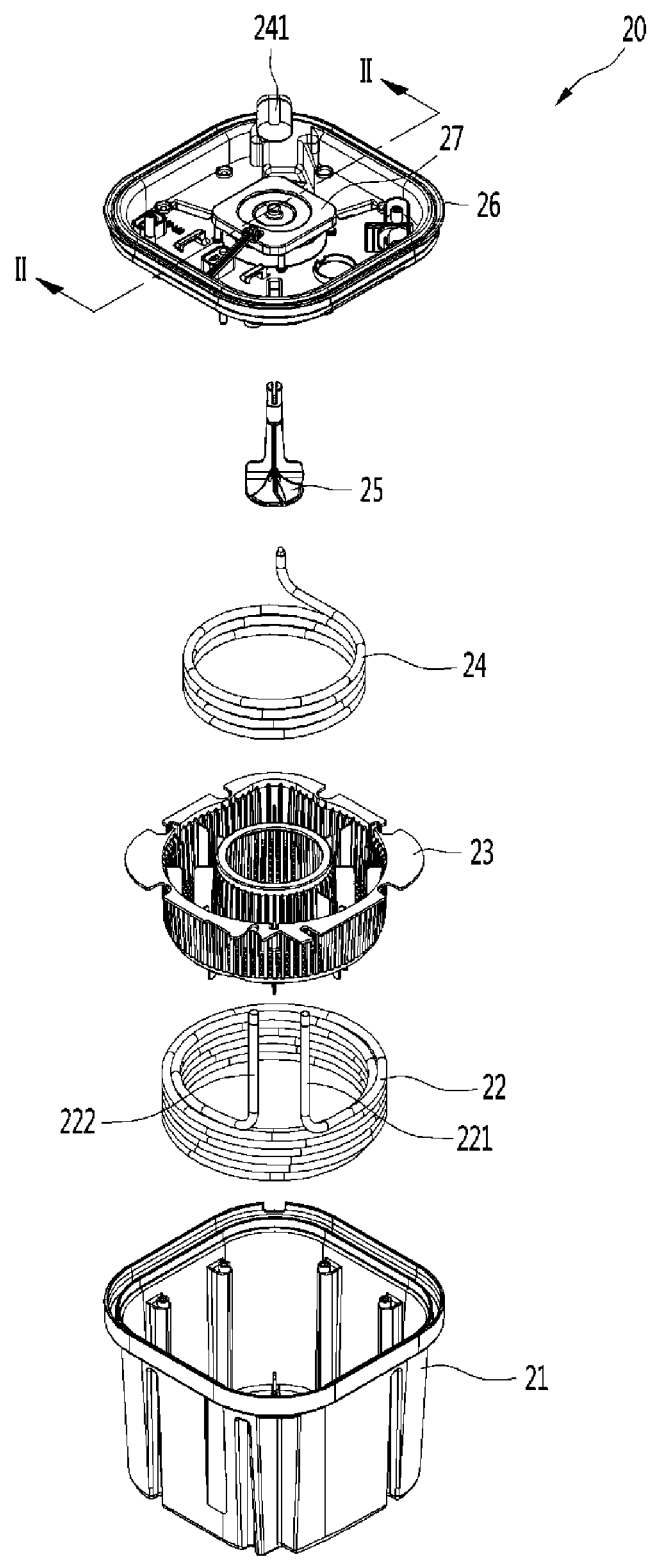
FIG. 3 is an exploded perspective view of the cold water production unit.
Figure 4:
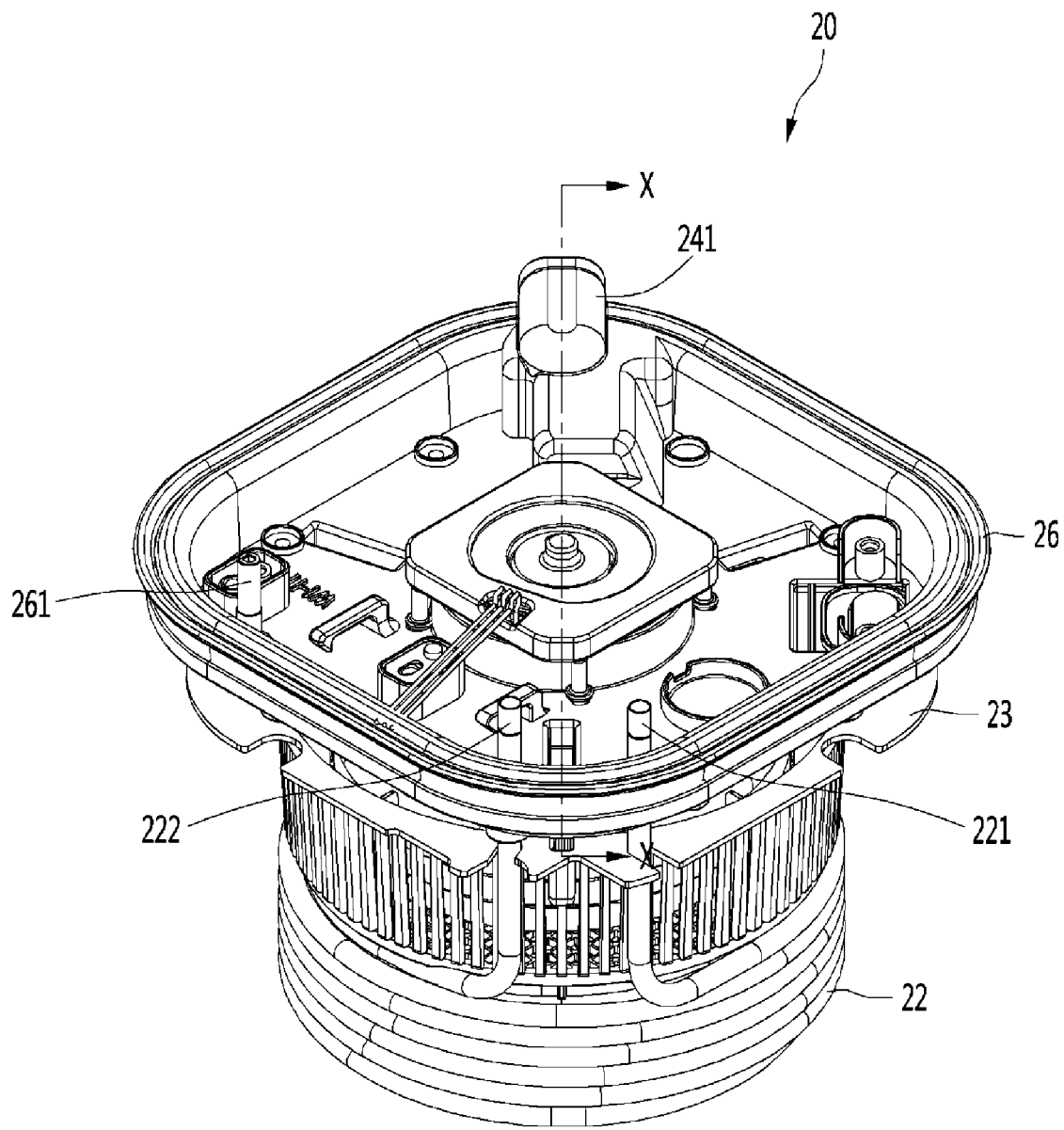
FIG. 4 is a perspective view of the assembly of the cold water production unit with a cooling water tank removed.

Referring to FIGS. 2 to 4, a cold water production unit (or water cooler) 20 according to an embodiment of the present disclosure may include: a cooling water tank 21 that holds cooling water; an insulating case (not shown) to insulate the cooling water tank 21 from the interior air; a drain valve (not shown) that is connected to the internal space of the cooling water tank 21 through the insulating case; a cold water pipe (or cold water coil) 22 that passes through the cooling water tank 21; a separator 23 that is provided over the cold water pipe 22 in the cooling water tank 21; an evaporator (or evaporator coil) 24 that passes through the cooling water tank 21 above the separator 23; a stirring motor support 26 that is provided at a top of the cooling water tank 21 and functions as a cover for sealing the cooling water tank 21; a stirring motor 27 that is fixed inside the stirring motor support 26 and has a rotary shaft extending downward; a stirring member (or stirring head) 25 that is provided in the cooling water tank 21 and is connected to the rotary shaft of the stirring motor 27; and a tank cover (not shown) that covers the open top of the cooling water tank 21.

In one implementation, the drain valve may be provided through the insulating case and the cooling water tank 21 and may be inserted through a side of the insulating case corresponding to a portion adjacent to the bottom of the cooling water tank 21. When the drain valve is opened, the water or other liquid in the cooling water tank 21 can be discharged out of the water purifier 10.

The cold water pipe 22 may be a coil that is wound into a cylinder or other shape. In the cold water pipe 22, vertically adjacent portions may be in contact each other or may be spaced apart at a predetermined distance from each other. Similarly, horizontally adjacent portions may contact each other or may be spaced apart at a predetermined distance from each other.

The cold water pipe 22 may be, as shown in the figures, wound several times horizontally with respect to the cooling water tank 21 to extend in a spiral or helical direction such that the cold water pipe 22 includes two or more concentric layers of piping. The cold water pipe 22 may be doubly wound in one embodiment to form two layers. In detail, the cold water pipe 22 may be spirally doubly wound into a substantially cylindrical shape such that the vertical side portions include two layers of piping. Although examples in which the cold water pipe 22 is double wound are discussed herein, it should be appreciated that the cold water pipe 22 may be wound into three or more layers.

When the cold water pipe 22 is wound several times to form multiple concentric layers of piping, the heat exchange area between the purified water flowing through the cold water pipe 22 and the cooling water in the tank 21 can be relatively increased since a greater length of the cold water pipe 22 is positioned within a same amount of the cooling water. Furthermore, since the cold water pipe 22 is wound several times, the entire height of the cold water pipe 22 can be decreased in comparison to a single wound pipe of similar length. For example, if the cold water pipe 22 is double wound, the entire height of the cold water pipe 22 can be decreased by half. Accordingly, a sufficient heat exchange area may be provided between the purified water flowing through the cold water pipe 22 and the cooling water in the cooling water tank 21, while a height of the cold water pipe 22 and an associated height for the cooling water tank 21 holding the cold water pipe 22 may be decreased.

The cold water pipe 22 may be constructed from stainless steel, brass, or other metal or other material of high thermal conductivity and may be formed by winding a hollow cylinder pipe into the double wound coil shape shown in the figures. Since the cold water pipe 22 may be constructed from a material and shape with a relatively high elasticity or rigidity, such as stainless steel piping, a spring-back of the cold water pipe 22 may occur due to the doubly wound shape. In spring-back, the high-rigidity object tends to return to an original shape (e.g., a straight pipe) due to a returning force associated with the material and shape. In order to prevent the spring-back, one embodiment includes a holder on the bottom of the cooling water tank 21 (see FIG. 8) for holding the cold water pipe 22 in the double wound shape, and aspects of the holder will be described in detail below.

In the cold water pipe 22, an inlet end 221 may be connected to a channel to the water supplier, and an outlet end 222 may be connected to a channel to the water chute 15 to output the chilled purified water. Since the cold water pipe 22 is doubly wound, both the inlet end 221 and the outlet end 222 bend and extend in a common direction from the cold water pipe 22. For example, the inlet end 221 and the outlet end 222 of the cold water pipe 22 may vertically extend toward the stirring motor support 26. If the cold water pipe 22 is wound odd-numbered times (e.g., three times, five times, etc.) to form an odd number of layers, the inlet end 221 and the outlet end 222 would be positioned at opposite vertical edges of the cold water pipe 22. In this configuration, it may be complicated or difficult to support the cold water pipe 22 within the cold water production unit 20. Accordingly, winding the cold water pipe 22 even-numbered times (e.g., doubly, four times, etc.) may decrease the complexity and costs of the cold water production unit 20.

The separator 23 may be provided over the cold water pipe 22 and may divide the internal space of the cooling water tank 21 into a first space in which the evaporator 24 is provided and a second space in which the cold water pipe 22 is provided. The separator 23 is perforated to include openings or holes that allow a circulation of the cooling water between the evaporator 24 and the cold water pipe 22. Accordingly, ice that is formed around the evaporator 24 in the first space and is larger than the perforations of the separator 23 cannot move to the cold water pipe 22 in the second space. Thus, the separator 23 helps prevent ice from blocking a flow of the cooling water around the cold water pipe 22.

The evaporator 24 may be positioned in the first space defined by the separator 23. The evaporator 24 is connected to the outlet end of the expansion valve that is connected to the outlet end of the condenser. A refrigerant that flows through a refrigerant pipe forming the evaporator 24 cools the cooling water in the cooling water tank 21 by exchanging heat with the cooling water within the cooling water tank 21. The cooling water cools purified water flowing through the cold water pipe 22 by a second heat exchange.

The stirring motor support 26 may be provided over the separator 23. The stirring motor support 26 is coupled to the top of the cooling water tank 21, whereby it can cover the top of the first space receiving the evaporator 24. That is, the first space may be defined between the stirring motor support 26 and the separator 23, while the second space may be defined between the separator 23 and the cooling water tank 21.

A cold water intake port 261 may be formed at a side of the stirring motor support 26. The cold water intake port 261 is connected to a channel to the water supplier or to channel passing carrying a purified water from the filter assembly so that the cooling water tank 21 can be supplied with the cooling water. An evaporator connector 241 may be formed at another portion or side of the stirring motor support 26. The evaporator connector 241 may be connected to the inlet end of the evaporator 24 to provide the refrigerant to the evaporator 24.

The stirring member 25 may be positioned substantially in a middle portion of the second space, but is not limited thereto. When the stirring member 25 is rotated (e.g., by the stirring motor 27), the cooling water is freely moved and mixed between the first space and the second space within the cooling water tank 21 through the separator 23. Accordingly, the temperature of the cooling water cooled by the evaporator 24 may be more uniformly maintained throughout the inside of the cooling water tank 21. The stirring member 25 may be formed in a blade shape or an impeller shape radially extending from the rotary shaft, as shown in the figures, but is not limited thereto and may be formed in various shapes.

Figure 5:
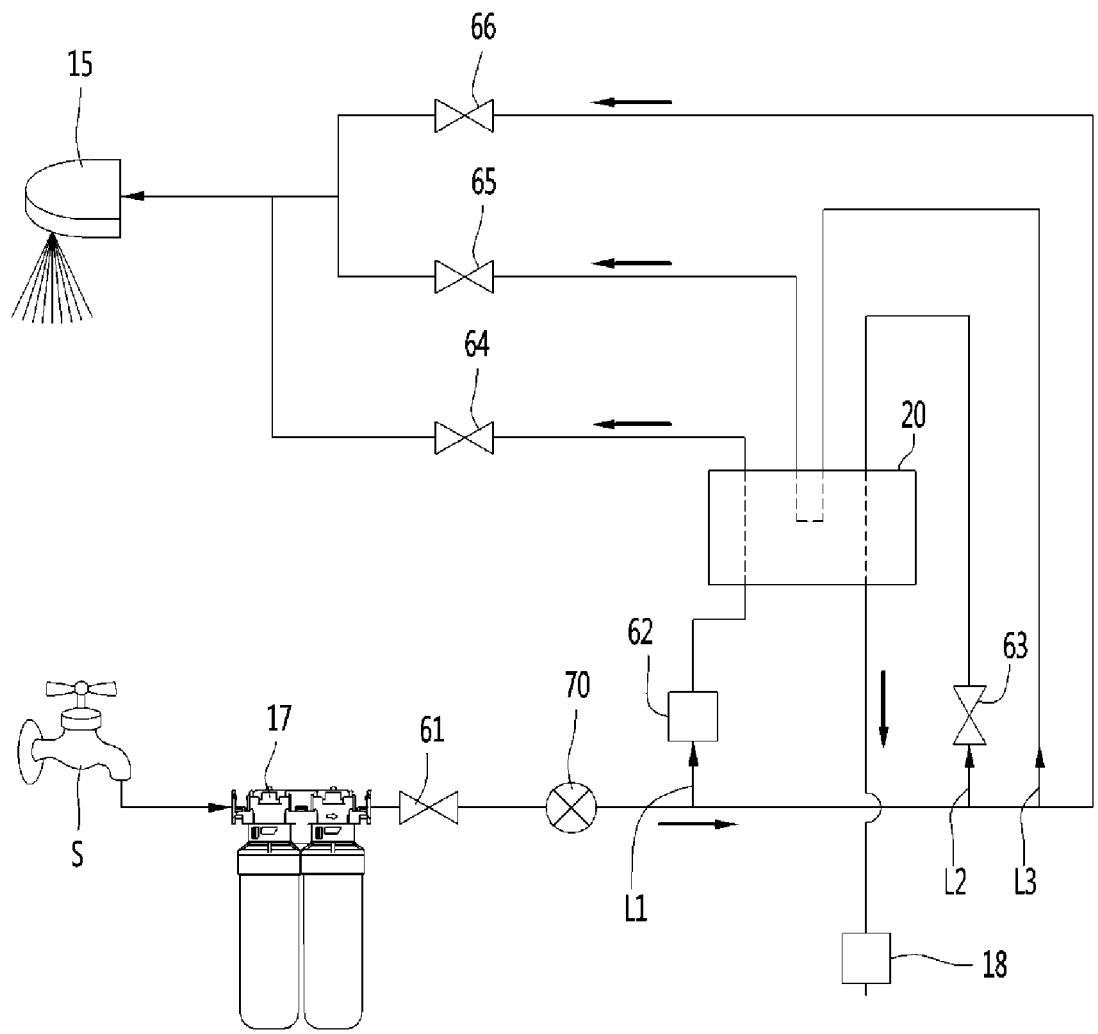
FIG. 5 is a system diagram showing a water channel connected to the water purifier according to an embodiment of the present disclosure.

FIG. 5 is a system diagram showing a water channel associated with the water purifier 10 according to an embodiment of the present disclosure. Referring to FIG. 5, a water supply line L is formed from a water supplier S to the water chute 15 of the water purifier 10 and various valves and components for purifying water may be connected to the water supply line L. In detail, the water supply line L is connected to the water supplier S, such as a faucet in a house, and a filter assembly 17 is provided at a predetermined portion of the water supply line L so that the filter assembly 17 can filter or remove foreign substances to purify the water supplied from the water supplier S.

A water supply valve 61 and a flow sensor 70 may be sequentially provided on the water supply line L connected to the outlet end of the filter assembly 17. Accordingly, when the amount of water sensed by the flow sensor 70 reaches a set flow rate, the water supply valve 61 can be controlled to maintain this flow rate. A hot water line L1, a cooling water line L2, and a cold water line L3 may diverge from a predetermined portion of the water supply line L extending from the outlet end of the flow sensor 70.

A purified (i.e., room temperature) water valve 66 may be provided at the end of the water supply line L extending from the outlet end of the flow sensor 70 and a hot water valve 64 may be provided at the end of the hot water line L1. A cold water valve 65 may be provided at the end of the cold water line L3, and a cooling water valve 63 may be provided at a predetermined portion of the cooling water line L2. In detail, the cooling water valve 63 is provided at a predetermined portion of the water supply line L that connects the cooling water intake port 261 and the diverging point of the cooling water line L2, so cooling water valve 63 can control the amount of cooling water that is supplied to the cooling water tank 21.

The water supply lines extending from the outlet ends of the hot water valve 64, the cold water valve 65, and the purified water valve 66 may all be connected to the water chute 15. Further, as shown in the figures, the purified (i.e., room temperature) water, the cold water, and the hot water may be connected to a single output or may be connected to respective different outputs.

The drain valve 18 may be provided on a water supply line extending out of the cold water production unit 20, as shown in FIG. 5. In another example, the drain valve 18 may be inserted through the cooling water tank 21, as described above.

A flow control valve 62 may be provided at a predetermined position of the hot water line L1 (e.g., after the flow sensor 70), and a heater (not shown) may be connected to the hot water line L1 extending from an outlet end of the flow control valve 62. A hot water valve 64 may be provided in a portion of the water supply line L that extends from an outlet end of the heater. For example, water may be heated to a predetermined temperature in the heater after flowing through the hot water line L1, and when a hot water button of the operation display unit 14 (or other input) is selected, the hot water valve 64 is opened to dispense hot water through the water chute 15.

Figure 6:
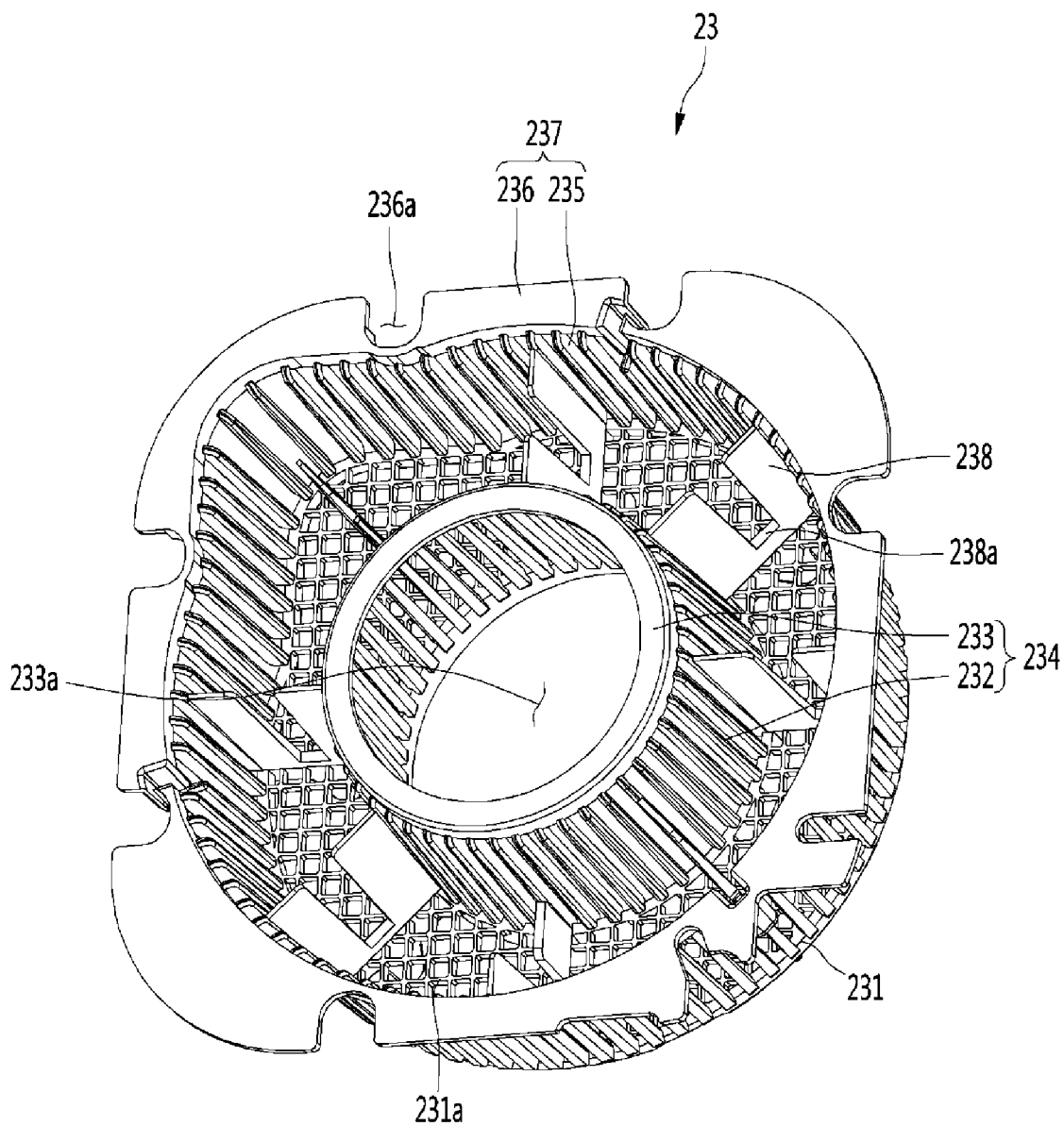
FIG. 6 is a top perspective view of a separator that is combined with the cold water production unit of the water purifier according to an embodiment of the present disclosure.
Figure 7:
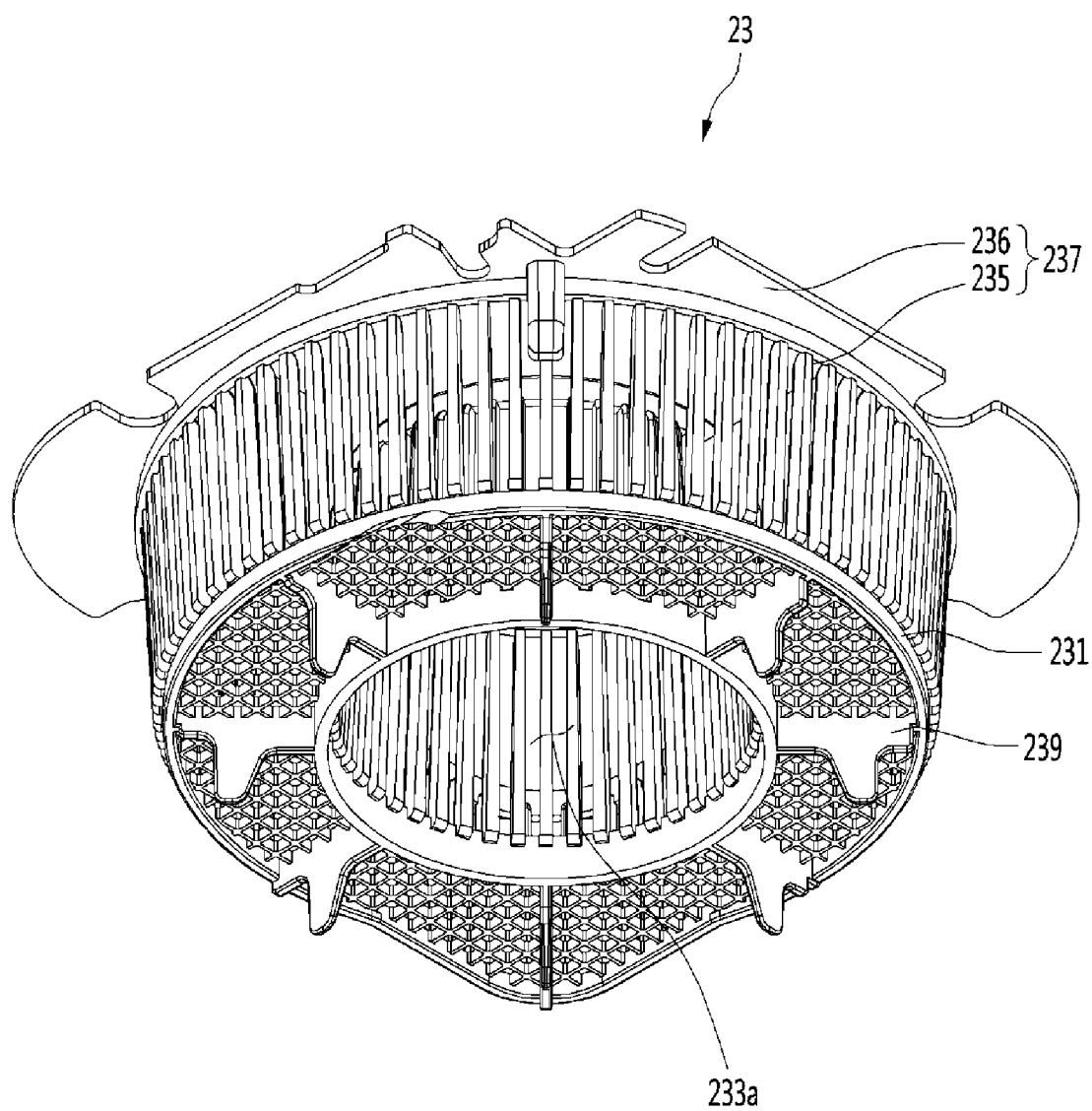
FIG. 7 is a bottom perspective view of the separator.

The separator 23 according to the present disclosure is described hereafter in detail with reference to the drawings. FIG. 6 is a top perspective view of the separator 23 that is combined with the cold water production unit of the water purifier according to an embodiment of the present disclosure and FIG. 7 is a bottom perspective view of the separator 23. Referring to FIGS. 6 and 7, the separator 23 may be molded plastic. In particular, the separator 23 may be made of soft bendable plastic, such as a polyethylene. The separator 23 is provided inside the cooling water tank 21 and may have a conical shape, such that the separator 23 divides the internal space of the cooling water tank 21 into the first space within the separator 23 and the second space outside the separator 23. A portion (e.g., a top rib 236) may be fixed to an inner surface of the cooling water tank 21 or may be held in a desired positioned through contact with the cold water pipe 22 and/or the evaporator 24.

In detail, the separator 23 may have a bottom (or bottom layer) 231 horizontally placed in the cooling water tank 21, a first extension 234 extending upward from a portion of the bottom 231, and a plurality of separation walls 238 extending upward from the bottom 231 to divide the first space into several spaces. The bottom 231 is composed of a plurality of latticed ribs 231a, and holes through which cooling water flows are formed between the latticed ribs 231a. Cooling water within the cooling water tank can freely move between the first space and the second space through the holes the latticed ribs 231a. The bottom 231 may be formed in a shape that is substantially similar to a corresponding transverse plane in the cooling water tank 21. For example, the size and shape of the bottom 231 may correspond to interior surfaces of the cooling water tank 21.

A substantially circular center hole may be formed at or near the center of the bottom 231, and the first extension 234 may extends upward from the edge of the center hole. In detail, the first extension 234 may have a plurality of first vertical ribs 232 extending upward from the edge of the center hole and a circular band-shaped first top rib 233 connecting the upper ends of the first vertical ribs 232.

The first vertical ribs 232 may be arranged with substantially regular intervals around the center hole in the bottom 231. The first vertical ribs 232 may include ribs vertically extending from (e.g., orthogonal to) a horizontal surface (e.g., from bottom 231). The first vertical ribs 232 may further include ribs extending at an angle from the horizontal surface or that otherwise extend between two or more of vertically extending ribs. A cylindrical or a truncated conical space may be formed by the first vertical ribs 232 and the first top rib (or ring) 233, and this space may be referred to as a stirring member hole (or stirring member cavity) 233a. That is, the stirring member 25 may be positioned in the second space of the cooling water tank 21 through the stirring member hole 233a. The space formed inside the first extension 234 (that is, the stirring member hole 233a) may also be referred to herein as a "third" space.

The separation walls 238 are formed in planar shapes and may extend laterally from the first vertical ribs 232 and vertically upwards from the bottom 231 to divide the first space into several sub-regions. In detail, the separation walls 238 may be arranged at regular intervals around the center hole. Accordingly, the first space can be divided into several sub-regions defined by the first vertical ribs 232, the separation walls 238, and the inner side of the cooling water tank 21. Therefore, ice that is formed in the first space through a heat exchange between the evaporator 24 and the cooling water in the tank 21 can remain in one of sub-regions inside the first space and is blocked from moving to the other sub-regions inside the first space.

The separation walls 238 may each have a seating groove 238a for holding the evaporator 24. That is, the refrigerant pipe of the evaporator 24 may be spirally wound several times through the seating grooves 238a of the separation walls 238. The width of the seating grooves 238a may be the same as or slightly larger than an outer diameter of the refrigerant pipe of the evaporator 24 so that the evaporator 24 may be received in and supported by the seating grooves 238a.

The separation walls 238 may be integrally formed with the bottom 231. Alternatively, the separation walls 238 may be detachably formed. For example, the separation wall 238 may be detachably fitted in the bottom 231 or may be fitted between the first vertical ribs 232 and the second vertical ribs 235. That is, the separation walls 238 may be selectively attached or detached by a user.

The separator 23 may further have second extensions 237 extending upward from an outside edge of the bottom 231. In detail, the second extension 237 may have a plurality of second vertical ribs 235 extending upward from the edge of the bottom 231 and a second top rib (or top layer) 236 connecting the upper ends of the second vertical ribs 235. The second top rib 236 may be fitted in the cooling water tank 21. That is, the outer edge of the second top rib 236 may be brought in close contact with (e.g., within a threshold distance of) the inner interior surface of the cooling water tank 21.

Coupling grooves 236a may be formed at an lateral outside edge of the second top rib 236, and the coupling grooves 236a may be sized and positioned to fit on coupling projections (not shown) formed on the inner surface of the cooling water tank 21 to couple the separator 23 to the inner surface of the cooling water tank 21. The coupling grooves 236a may be formed in various shapes, quantities, or locations, depending on the shapes, quantities, or locations of the coupling projections.

The second vertical ribs 235 may be spaced around the edge of the bottom 231 and may be coupled to or otherwise extend from an upper surface of the bottom 231. The second vertical ribs 235 are arranged around the separation walls 238, and some of the second vertical ribs 235 may be connected to the ends of the separation walls 238. The separation wall 238 may be positioned between the first vertical ribs 232 and the second vertical ribs 235. Accordingly, the first space can be divided into several spaces by the first vertical ribs 232, the separation walls 238, and the second vertical ribs 235. Therefore, as previously described, ice that is formed near the evaporator 24 in one of the sub-regions of the first space remains in that sub-regions and is blocked by the separation walls 238 from moving to the other sub-regions of the first space. Consequently, ice coming off the evaporator 24 does not contact the walls of the cooling water tank 21, so the ice does not generate noise by impacting the cooling water tank 21 and does not damage the cooling water tank 21.

Cold water pipe seats (or cold water pipe extensions) 239 may be formed in an underside of the bottom 231. The cold water pipe seats 239 may protrude from the underside of the bottom 231 and may be partially stepped. For example, the cold water pipe seats 239 may have stepped sides that are rounded with a curvature corresponding to the outer diameter of a portion of a coiled shape formed by winding the cold water pipe 22. Accordingly, an uppermost portion of the cold water pipe 22 can be seated on the cold water pipe seats 239 (see FIG. 8).

Figure 8:
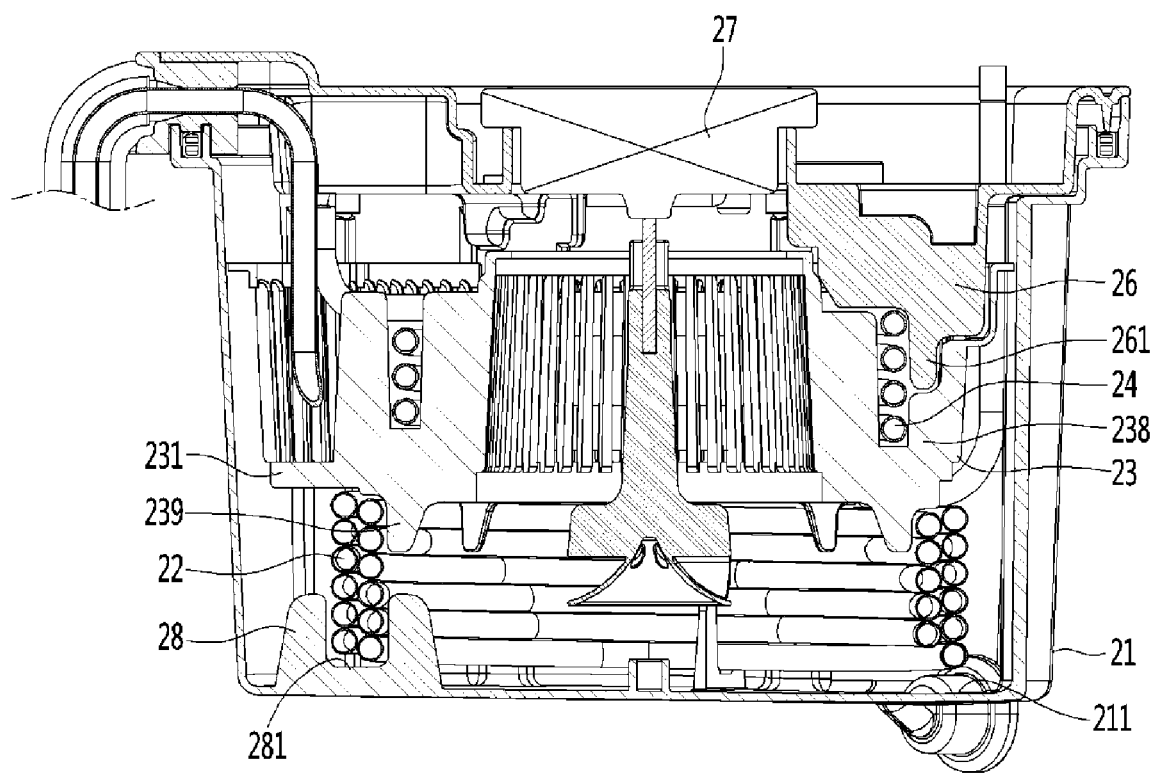
FIG. 8 is a vertical cross-sectional view taken along line X-X of FIG. 4.
Figure 9:
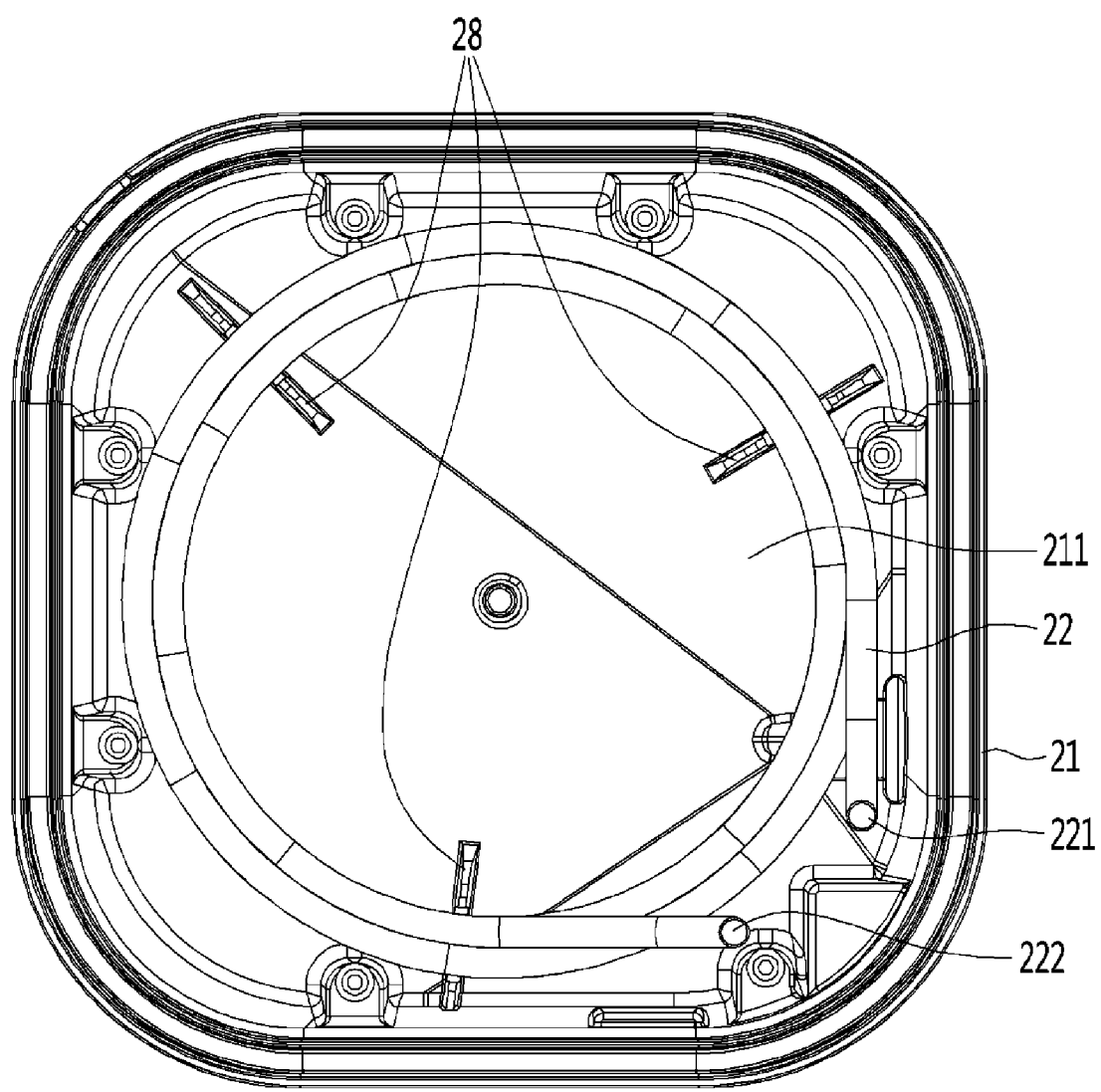
FIG. 9 is a plan view of a cold water pipe that is provided in a cooling water tank.

FIG. 8 is a vertical cross-sectional view taken along line X-X of FIG. 4, and FIG. 9 is a plan view of the cold water pipe 22 that is provided in the cooling water tank 21. Referring to FIGS. 8 and 9, the internal space of the cooling water tank 21 is divided into the first space and the second space by the separator 23 and a third space for receiving the stirring member 25 can be formed in the first space by the first extension 234, as previously described. The first space, with the exception for the third space, can be further divided into several sub-regions by the separation walls 238, as also previously described. In detail, the first space may be formed over the bottom 231 of the separator 23, and the second space may be formed under the bottom 231. The first space is divided into several sub-regions by the first extension 234, the separation walls 238, and the second extension 237.

The cold water pipe 22 is positioned above a bottom surface of the cooling water tank 21, and the separator 23 is positioned over the cold water pipe 22 in the cooling water tank 21. The outer edge of the second top rib 236, formed on the top portion of the separator 23, is in close contact with an inner surface of the cooling water tank 21 to position and fix the separator 23 in the cooling water tank 21. The cold water pipe seats 239 may be formed on the underside of the bottom 231 and may extend downward to contact and hold a portion of the cold water pipe 22 in a desired positioned.

The refrigerant pipe of the evaporator 24 may be wound several times inside the separator 23 to form a substantially round coiled shape. The coiled refrigerant pipe 24 may be supported in the seating grooves 238a of the separation walls 238 provided in the separator 23 to position the evaporator 24 in the first space.

When the stirring member 25 is rotated (e.g., by the storing motor 27), the cooling water is circulated in the cooling water tank 21, such as to move between the first space and the second space. This motion of the cooling water helps to maintain more uniform internal temperatures within the cooling water tank 21. Otherwise, water cooled by contact with the evaporator 24 may remain in the first space, and water warmed by contact with the cold water pipe 22 may remain in the second space, limiting the ability of cold water production unit 20 to cool the purified water passing through the cold water pipe 22.

Furthermore, the movement of the cooling water caused by the stirring motion of the stirring member 25 helps to melt ice generated in the first space by circulating relatively warmer water toward the ice. As previously described, the ice formed in the first space by contact with the evaporator 24 may be isolated in the first space by the separator 23 so that the ice cannot be move to the second space while the cooling water can circulate between the first and second spaces. Furthermore, since the first space is divided into several sub-regions by the separation walls 238 of the separator 23, ice formed in one of the sub-regions does not move to the other sub-regions. Thus, the ice made in the sub-regions cannot freely move within the first space to other sub-regions since the movement of the ice is limited by the separation walls 238. Consequently, the separation walls 238 may prevent a movement or a rotation of ice within the first space or region due to a clockwise or a counterclockwise flow of water that is formed by the stirring motion of the stirring member 25. Accordingly, the motion of the stirring member 25 does not cause the ice to move and contact the stirring member 25, the cold water pipe 22, the evaporator 24, or the interior surface of the cooling water tank 21, preventing the ice from damaging to these components and reducing noises caused by the ice impacting these components.

A holder (or holder rib) 28 for fixing the cold water pipe 22 within the second space may be formed inside the cooling water tank 21. For example, the holder 28 may protrude a predetermined height upward from the bottom (or bottom surface) 211 of the cooling water tank 21. In detail, the holder 28 may have a rib shape to receive and seat the wound cold water pipe 22. The holder 28 may include a seating groove 281 for receiving the cold water pipe 22, and the seating groove 281 may be formed at the top of the holder 281 in a substantially U-shape. The multiple wound cold water pipe 22 can be partially inserted in the seating groove 281 such that two or more layers of the cold water pipe 22 are positioned in close contact with surfaces of the holder 28. For example, an interior piping layer of the cold water pipe 22 may contact an interior vertical surface of the holder 28, and an exterior piping layer of the cold water pipe 22 may contact an exterior vertical surface of the holder 28. Accordingly, the holder 28 fixes and support the cold water pipe 22 to deter a bending of the cold water pipe 22 from spring-back and can prevent noise caused by a movement of the cold water pipe 22 within the cooling water tank 21.

A plurality of holders 28 may be formed on the bottom 211 of the cooling water tank 21. For example, three holders 28 may be formed on the bottom of the cooling water tank 21 and may be arranged at a predetermined distance circumferentially along the cold water pipe 22. For example, the three holders 28 may be arranged with regular intervals such that an angle distance between two adjacent ones of the holders 28 is about 120°. The holders 28 simultaneously hold the cold water pipe 22, so the cold water pipe 22 can be firmly fixed without moving or shaking within the cooling water tank 21. However, it should be appreciated that the number of the holders 28 is not limited to three, and the cold water production unit 20 may include fewer or more holders 28. Furthermore, it should be appreciated that the holders 28 may be spaced apart at different, non-uniform intervals as appropriate to fix the position of the cold water pipe 22 while providing sufficient space in the cold water production unit 20 for other components. For instance, the holders 28 may be positioned away from the drain valve 18.

The structure for fixing the cold water pipe 22 with the components of the cold water production unit 20 is described hereafter with reference to FIG. 8. For example, the cold water pipe 22 may contact and, therefore, be fixed in a given location in the cold water production unit 20 by the cooling water tank 21, the separator 23, and the stirring motor support 26. In detail, the holders 28 on the bottom 211 of the cooling water tank 21 may contact a lower portion of the cold water pipe 22 such that the lower portion of the cold water pipe 22 contacts the interior surfaces of the seating grooves 281 of the holders 28. Accordingly, when the cold water pipe 22 is double wound to include two layers of piping, a first layer of the cold water pipe 22 may be supported by one surface of the seating grooves 281, and a second layer of the cold water pipe 22 may be supported by a second surface of the seating grooves such that the two layers of the cold water pipe 22 are held in close contact with each other and cannot separate.

The cold water pipe seats 239 are formed to extend from the bottom of the separator 23 to be in close contact with a top portion of the cold water pipe 22. More specifically, the top interior portion of the cold water pipe 22 can contact a lateral exterior surface of the cold water pipe seats 239. Thus, the cold water pipe seats 239 may contact the innermost layer of the cold water pipe 22. For example, the cold water pipe seats 239 and the innermost layer of the cold water pipe 22 may be designed to be forcibly fitted against each other, such as configuring an interior radius of the cold water pipe 22 to be slightly smaller than a radial distance associated with the cold water pipe seats 239 to cause that interior layer of the cold water pipe 22 to apply a compressive force against lateral exterior surfaces of the cold water pipe seats 239. In this case, the cold water pipe seats 239 applies outward pressure to push a portion of the cold water pipe 22 away from a center so the cold water pipe 22 can be firmly supported. Furthermore, since the cold water pipe 22 is fitted between the holders 28 and the cold water pipe seats 239, a spring-back due to double (or more) winding of the cold water pipe 22 can be prevented.

The bottom of the stirring motor support 26 on which the stirring motor 27 is provided may be positioned in close contact with a top of the separator 23. Consequently, the stirring motor support 26 may provide a downward pressing force against the separator 23, and the separator 23 may transfer this downward pressing force against the cold water pipe 22 to fix the cold water pipe 22 more firmly against the holders 28 and the bottom 211 of the cooling water tank 21.

Figure 10:
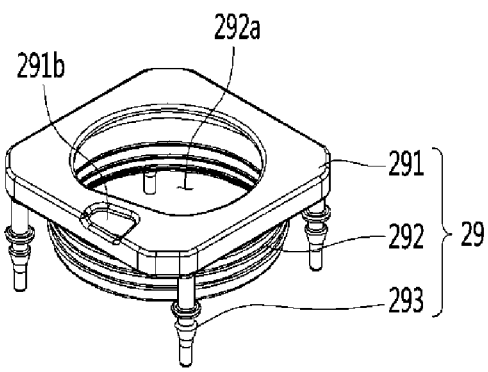
FIG. 10 is an exploded perspective view of a stirring motor support.
Figure 10:
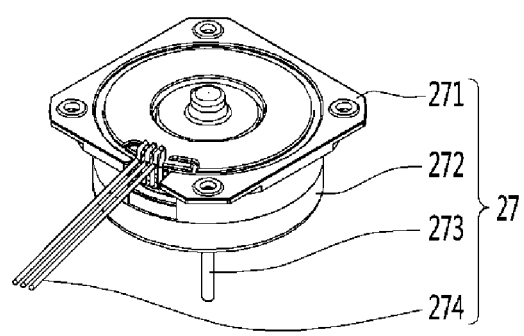
Figure 10:
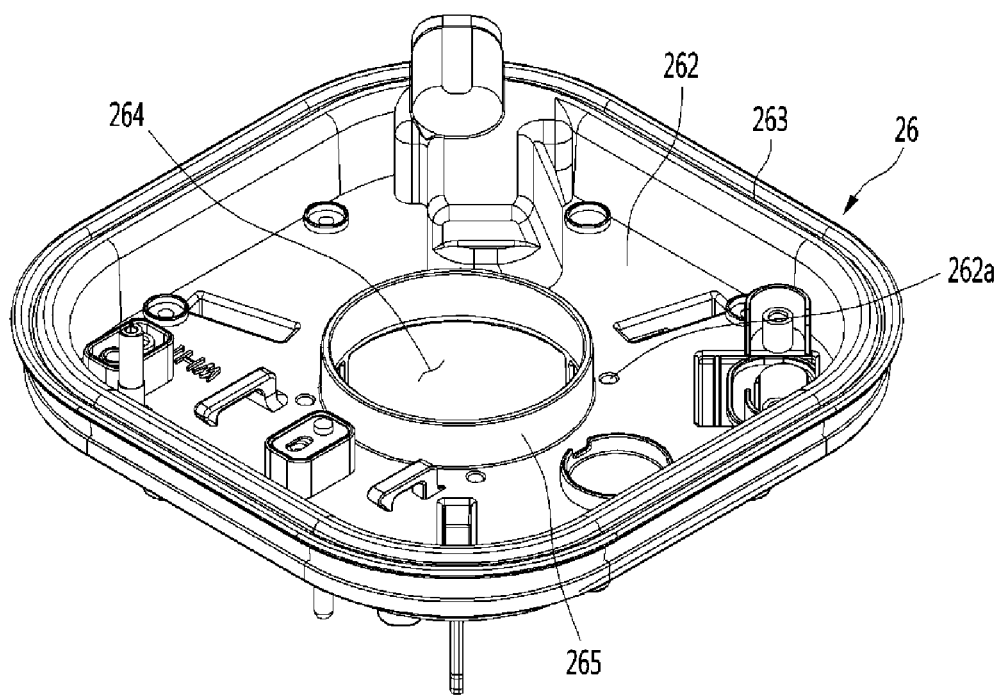
Figure 11:
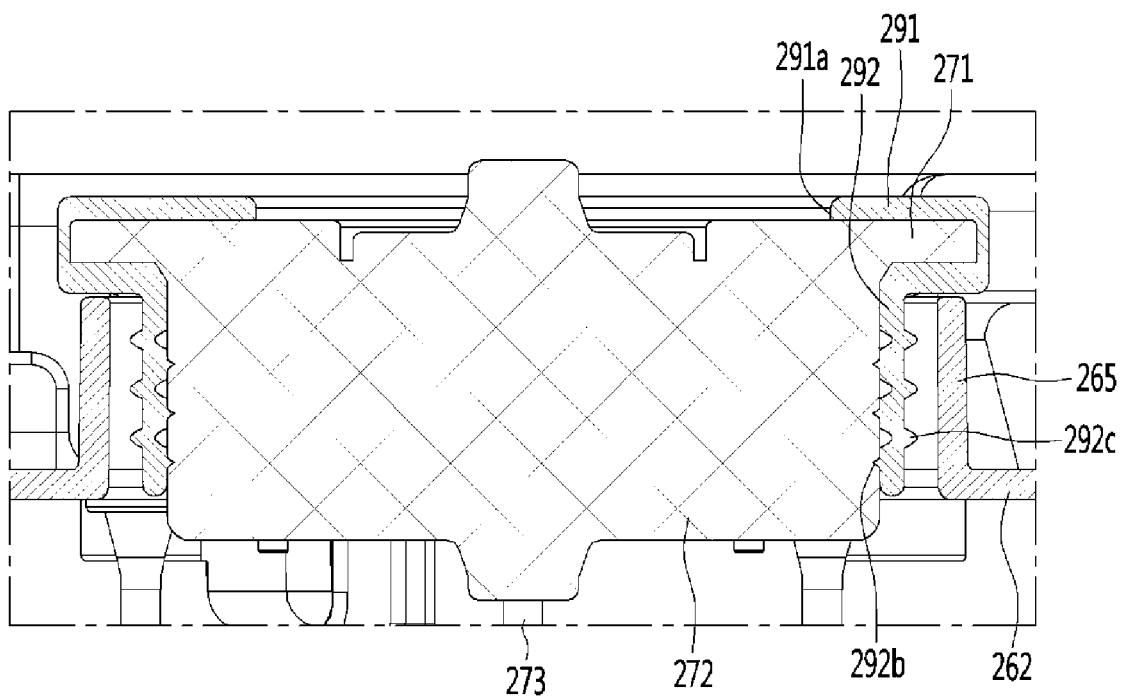
FIG. 11 is a vertical cross-sectional view taken along line II-II of FIG. 3.

A structure for mounting the stirring motor according to an embodiment of the present disclosure is described hereafter in detail with reference to the drawings. FIG. 10 is an exploded perspective view of the stirring motor support 26, and FIG. 11 is a cross-sectional view taken along line II-II of FIG. 3. Referring to FIGS. 10 and 11, a stirring motor cap 29 is mounted on the stirring motor support 26 and fitted on the stirring motor 27. The stirring motor cap 29 may be constructed of an elastic material, such as rubber or silicon, and may absorb vibration that is generated by the stirring motor 27.

The stirring motor support 26 has a bottom (or bottom layer) 262 that extends horizontally over the top of the cooling water tank 21. The stirring motor support 26 further includes an edge (or edge wall) 263 extending upward from a peripheral edge of the bottom 262. A seating hole 264 for receiving the stirring motor 27 may be formed at or near a central portion of the bottom 262, and a seating rib 265 protrudes upward from the bottom 262 around a peripheral edge of the seating hole 264. In one example, the seating rib 265 may have a substantially hollow cylindrical shape with a horizontal top. Although depicted in the figures as having a substantially circular shape, it should be appreciated that seating rib 265 and the seating hole 264 contained therein may have any shape for receiving the stirring motor 27. Furthermore, different sections of the seating rib 265 may vary in width such that a shape of an interior wall of the seating rib 265 may differ from a shape of an exterior wall of the seating rib 265, when viewed in a plan view.

An upper end or portion of the stirring motor cap 29 and the stirring motor 27 may be positioned on the horizontal top surface of the seating rib 265, and a lower portion of the stirring motor cap 29, which surrounds the stirring motor 27, may be inserted in the seating hole 264. An outer surface of the lower portion of the stirring motor cap 29, which is inserted within the seating hole 264, may be shaped and sized such that the outer surface of the inserted portion is positioned at least a threshold distance from an inner surface of the seating rib 265. Accordingly, the stirring motor cap 29 positions the stirring motor cap 29 away from the inner surface of the seating rib 265 to decrease transmissions of vibrations from the stirring motor 27 to the seating rib 265.

A plurality of fastening holes 262a may be formed in the bottom 262 around the seating rib 265. In one example, the fastening holes 262a may be positioned at regular intervals around the seating rib 265. The stirring motor cap 29 may be fastened to the stirring motor support 26 at the fastening holes 262a. For example, the stirring motor cap 29 can be fastened to the fastening holes 262a and seated on the seating rib 265. A structure for fastening the stirring motor cap 29 to the fastening holes 262a will be described below.

In one example, the stirring motor 27 may include a cylindrical motor body 272 having a rotary shaft 273 to which the stirring member 25 is coupled and a motor case 271 coupled to the top of the motor body 272. The motor body 272 may position the rotary shaft 273 to extend downward so that the stirring member 25 can be coupled to the rotary shaft 273. A motor case 271 may be coupled to the top of the motor body 272 so that the motor body 272 can be protected by the motor case 271. A power line 274 extending from an external power supplier may be connected to the motor body 272 through the top of the motor case 271. The top of the motor case 271 may be formed in a rectangular shape or other shape for coupling the stirring motor 27 to the stirring motor cap 29.

The stirring motor cap 29 covers the sides and the top edge of the stirring motor 27, and the stirring motor cap 29 may define a motor space 292a for receiving the stirring motor 27. For example, the stirring motor cap 29 may have a plate (or upper layer) 291 having a retention hole 291a at the center, an extension 292 extending downward from a bottom surface of the plate 291, and a plurality of fastening portions (or fasteners) 293 protruding downward from the edge of the bottom of the plate 291.

In detail, the plate 291 has an internal space in which the motor case 271 of the stirring motor 27 is inserted. The internal space of the plate 291 has a shape corresponding to the upper end of the stirring motor 27, and the upper end of the stirring motor 27 is fitted in the internal space of the plate 291. When the upper end of the stirring motor 27 is fully inserted in the internal space of the plate 291, a top surface of the stirring motor 27 may be partially exposed through the retention hole 291a of the plate 291.

The extension 292 protrudes downward from the bottom of the plate 291 to form an internal space. For example, the extension 292 may protrude to form a hollow cylindrical shape. The extension 292 may form a portion of the motor space 292a for holding the stirring motor 27 and positions the stirring motor 27 to contact or to be positioned less than a threshold distance from internal surfaces of the stirring motor cap 29 defining the motor space 292a. The retention hole 291a formed within the plate 291 may be smaller in diameter than the motor space 292a. Accordingly, the stirring motor 27, when inserted in the motor space 292a, can be prevented from separating upward from the motor space 292a by a portion of the plate 291 around the retention hole 291a.

Retention ribs 292b may be formed on an inner surface of the extension 292 to hold the stirring motor 27 when inserted in the motor space 292a. Accordingly, the stirring motor 27, when inserted in the motor space 292a, can be deterred from separating downward from the motor space 292a. In one example, the retention ribs 292b may be annular or circular bands that each protrude from the inner surface of the extension 292 to contact the motor body 272 or other portion of the stirring motor 27. The retention ribs 292b may be positioned at different vertical positions or heights on the inner surface of the extension 292. In other examples, the retention ribs 292b may have different shapes, such as extending in a spiral form or may be arcs that extend less that a full circumference of the inner surface of the extension 292.

In another example, the retention ribs 292b may protrude inward and upward at an angle from the interior surface of the extension 292. In this example, the retention ribs 292b may be extend upward at a predetermined angle rather than horizontally protruding. In this case, when the stirring motor 27 is inserted upward through the extension 292 to be fitted into the motor space 292a, the retention ribs 292b may be deformed upward and away from the sides of the stirring motor 27 such that the stirring motor 27 can be smoothly inserted up into the motor space 292a. After the stirring motor 27 is inserted, an initial downward movement of the stirring motor 27 may apply a force that presses the ends of the retention ribs 292b downward and outward to engage the outer side surfaces of the stirring motor 27, thereby preventing the stirring motor 27 from moving further downward and separating from the motor space 292a.

Meanwhile, grooves 292c may be formed on the inner surface of the extension 292 to reduce an area of contact with the outer side surface of the stirring motor 27. The grooves 292c may be recesses in the inner side surface of the extension 292c, and each of the grooves may be formed may be circular or semi-circular depressions that extend into the interior side surface of the extension 292. The grooves 292c may be arranged at different heights on the inner side of the extension 292. Accordingly, the total contact area between the outer surface of the stirring motor 27 and the inner surface of the extension 292 may be decreased, so that fewer vibrations of the stirring motor 27 are transmitted to the extension 292, and the resulting noise can be reduced.

Figure 12:
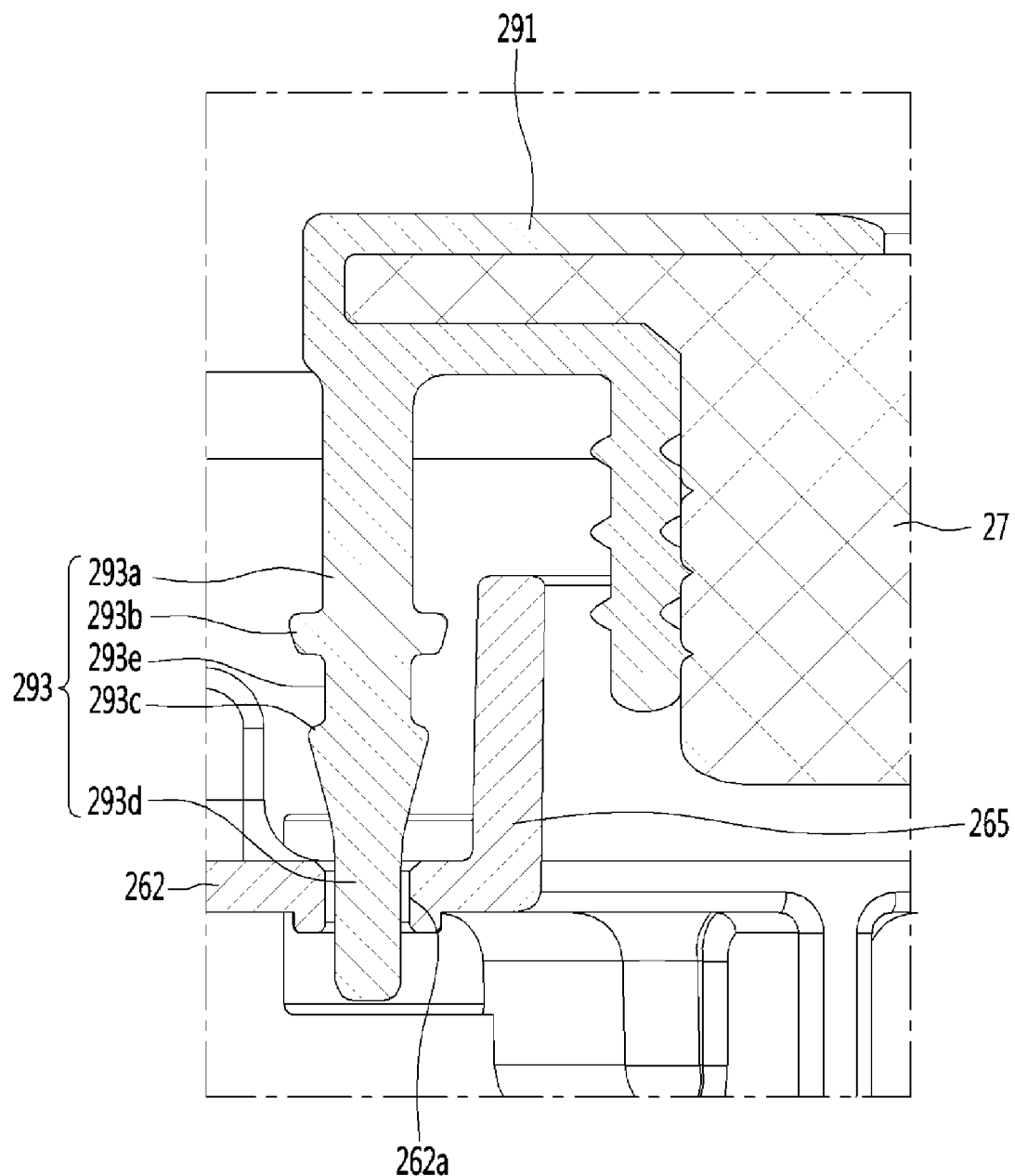
FIGS. 12 and 13 are cross-sectional views showing a structure for fitting a fastening portion of a stirring motor cap according to an embodiment of the present disclosure into a fastening hole of the stirring motor support.
Figure 13:
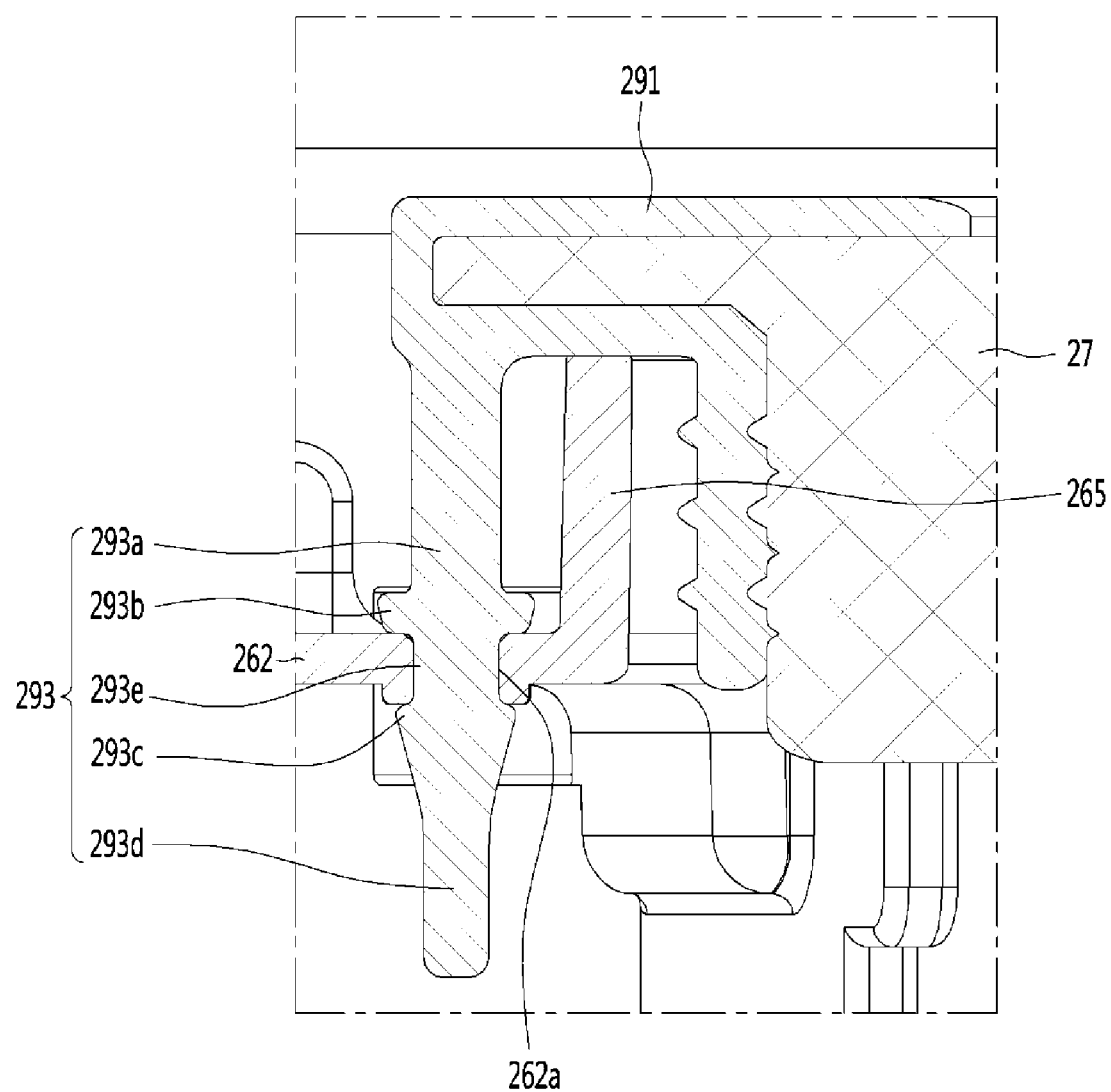

The structure for fastening the fastening portions of the stirring motor cap to the fastening holes of the stirring motor support is described hereafter in detail with reference to the drawings. FIGS. 12 and 13 are cross-sectional views showing a structure for fitting a fastening portion 293 of the stirring motor cap 29 into a fastening hole of the stirring motor support 26 according to an embodiment of the present disclosure.

As previously described, the fastening portions 293 are formed at the outside lateral edge of the bottom surface of the stirring motor cap 29. The fastening portions 293 firmly fix the stirring motor hosing 29 to the upper end of the seating rib 265 of the stirring motor support 26. In one example, the fastening portions 293 may be made from an elastic, soft material, and portions of the fastening portions 293 may be deformed to be fitted into and engage the fastening holes 262a formed around the seating rib 265.

In detail, the fastening portions 293 each may have a body (or shaft) 293a protruding a predetermine distance downward from the edge of the bottom of the plate 291, a stopper (or flange) 293b laterally protruding at a substantially middle portion of the body 293a, an inclining portion (or inclined step) 293c that initially extends outward at a predetermined position of the body 293a below the stopper 239b and then tapers inward at lower positions, and a lower end portion (or tip) 293d extending downward from the inclining portion 293c and having a diameter smaller than the upper end portion of the body 293a. The portion of the fastening portions 293 between the stopper 293b and the inclining portion 293c of the body 293c may be defined as a locking portion (or neck) 293e that is fitted in the fastening hole 262a.

In detail, the lower end portion 293d is smaller in diameter than the fastening hole 262a to pass through the fastening hole 262a of the stirring motor support 26. The inclining portion 293c may extend upward at a predetermined angle from the lower end portion 293d. That is, the inclining portion 293c increases in diameter as it goes up. The locking portion 293e is a portion that is fitted into the fastening hole 262a and has a diameter substantially equal to or slightly larger than that of the fastening hole 262a.

A process of fitting the fastening portion 293 into the fastening hole 262a is now described. First, the stirring motor 27 is inserted into the motor space 292a of the stirring motor cap 29. Since the stirring motor cap 29 is made of an elastic material, the stirring motor 27 can be tightly inserted in the stirring motor cap 29. The fastening portion 293 of the stirring motor cap 29 is pressed into the fastening hole 262a. The lower end portion 293d of the fastening portion 293 first passes through the fastening hole 262a, and when the lower end portion 293d completely passes through the fastening hole 262a, the inner surface of the fastening hole 262a comes in contact with the lower portion of the inclining portion 293c of the fastening portion 293. Since the inclining portion 293c is made of an elastic material or otherwise compressible material, when the fastening portion 293 is further pressed down, the fastening hole 262a can further slide up on the inclining portion 293c. In another example, the inclining portion 293c may have a spring or other compressible mechanism that allows the inclining portion 293c to be inserted into the fastening hole 262a and then applies a force to one or more surfaces of the fastening hole 262a. Accordingly, the fastening hole 262a, after sliding on the inclining portion 293c, is locked to the locking portion 293e. Additionally, the stopper 293b prevents the fastening portion 293 from being further inserted into the fastening hole 262a, while the fastening portion 293 is also retained in the fastening hole 262a by the top end of the inclining portion 293c.

As described above, the fastening portion 293 can be locked in the fastening hole 262a in a snap-fit type connection and can be fixed in close contact with the fastening hole 262a by its elasticity. Accordingly, since the fastening portions 293 are fixed to the fastening hole 262a, the stirring motor cap 29 remains coupled to the stirring motor support 26 even if stirring motor cap 29 is shaken by external shock or by vibrations of the stirring motor 27. Furthermore, since the fastening portions 293 are made of an elastic material such as rubber or silicon and absorb the vibrations of the stirring motor 27, the vibrations of the stirring motor 27 is not transmitted to the stirring motor support 26. Therefore, noise due to the vibration of the stirring motor 27 can be reduced.

An aspect of the present disclosure provides a water purifier in which vibration of a stirring motor is effectively prevented from being transmitted to other parts because the stirring motor is covered with an elastic cap. Another aspect of the present disclosure provides a water purifier in which vibration of a stirring motor is not transmitted to other parts through fastening portions and thus noise due to vibration of the stirring motor is considerably reduced because a cap combined with the stirring motor is fastened to a stirring motor support by soft fastening portions. Another aspect of the present disclosure provides a water purifier in which a stirring motor is firmly fixed without shaking because fastening portions of a cap are locked to a stirring motor support in a snap-fit type. Another aspect of the present disclosure provides a water purifier in which a stirring motor is prevented from separating upward from a cap by external shock because a retention hole smaller than the inner diameter of the stirring motor is formed through the top of the cap.

In a water purifier according to an aspect, a stirring motor cap that covers the side and the top edge of a stirring motor is seated on a stirring motor support. The stirring motor support has: a bottom that is horizontally formed and has a seating hole for receiving the stirring motor; and a seating rib that protrudes upward along the edge of the seating hole and supports the upper end of the stirring motor cap on the top. The stirring motor support further has a plurality of fastening holes that are spaced from each other around the seating rib to fasten the stirring motor cap.

In one implementation, a water purifier comprises a tank that holds a first liquid; an evaporator that extends into the tank to contact the first liquid, the evaporator carrying a refrigerant that cools the first liquid; a pipe that extends into the tank to contact the first liquid, the pipe carrying a second liquid that is cooled by the first liquid; a stirring head that is provided in the cooling water tank; a stirring motor coupled to the stirring head, the stirring motor moving the stirring head to circulate the first liquid; a stirring motor cap provided on a side surface and a top surface of the stirring motor; and a stirring motor support that is provided at a top of the tank, wherein the stirring motor support includes: a bottom layer that extends horizontally and has a seating hole to receive the stirring motor; a seating rib that protrudes upward from the bottom layer along an edge of the seating hole and supports an upper layer of the stirring motor cap; and a plurality of fastening holes that are spaced from each other around the seating rib, the stirring motor cap engaging the fastening holes to couple the stirring motor to the stirring motor support.

In another implementation, a water purifier comprises: a tank that holds a first liquid; an evaporator that extends into the tank to contact the first liquid, the evaporator carrying a refrigerant that cools the first liquid; a pipe that extends into the tank to contact the first liquid, the pipe carrying a second liquid that is cooled by the first liquid; a stirring motor coupled to a stirring head positioned within the first liquid and moving the stirring head to circulate the first liquid, wherein the stirring motor includes: a cylindrical motor body that has a rotary shaft provided at a bottom of the motor body, the rotary shaft being coupled to the stirring head; and a motor case that is coupled to a top portion of the motor body; a stirring motor cap to receive the stirring motor, wherein the stirring motor cap includes: an upper layer that is positioned over at least a portion of a top surface of the motor case; and an extension that protrudes downward from a bottom surface of the upper layer and covers at least a portion of a side surface of the motor body; and a stirring motor support that is provided at an upper portion of the tank, wherein the stirring motor support includes: a bottom layer that extends horizontally and has a seating hole to receive a portion of the stirring motor; and a seating rib that protrudes upward from an upper surface of the bottom layer along an edge of the seating hole, wherein a portion of the cylindrical motor body and a portion of the extension are received in the seating rib and a top surface of the seating rib supports the bottom surface of the upper layer of the stirring motor cap.

It should be understood that the present disclosure may be modified in various ways within the scope of the present disclosure by those skilled in the art and the scope of the present disclosure should be construed on the basis of claims.

Any reference in this specification to "one embodiment," "an embodiment," "example embodiment," etc., means that a particular feature, structure, or characteristic described in connection with the embodiment is included in at least one embodiment of the disclosure. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A liquid dispenser comprising:
   a tank that holds a first liquid;
   an evaporator that extends into the tank to contact the first liquid, the evaporator carrying a refrigerant that cools the first liquid;
   a pipe that extends into the tank to contact the first liquid, the pipe carrying a second liquid that is cooled by the first liquid;
   a perforated separator that divides an internal space of the tank into a first space that receives a portion of the evaporator and a second space that receives a portion of the pipe;
   a stirring head that is at least partially provided in the tank;
   a stirring motor coupled to the stirring head, the stirring motor moving the stirring head to circulate the first liquid;
   a stirring motor cap provided on a side surface and a top surface of the stirring motor; and
   a stirring motor support that is provided at a top of the tank and that is engaged to the stirring motor cap.

2. The liquid dispenser of claim 1, wherein the stirring motor includes:
   a cylindrical motor body that has a rotary shaft provided at a bottom of the motor body, the rotary shaft being coupled to the stirring head to apply a force from the stirring motor to move the stirring head; and
   a motor case that is coupled to a top portion of the stirring motor, and
   wherein the stirring motor cap is positioned on an outer surface of the stirring motor and a top surface of the motor case.

3. The liquid dispenser of claim 2, wherein the stirring motor support includes:
   a bottom layer that extends horizontally and has a seating hole to receive the stirring motor;
   a seating rib that protrudes upward from the bottom layer along an edge of the seating hole and supports an upper layer of the stirring motor cap; and
   a plurality of fastening holes that are spaced from each other around the seating rib, the stirring motor cap engaging the fastening holes to couple the stirring motor to the stirring motor support,
   wherein each of the seating hole and the seating rib has a circular shape, and
   an inner diameter of the seating hole is larger than a diameter of the outer surface of the motor body.

4. The liquid dispenser of claim 3, wherein the stirring motor cap includes:

an upper layer that is positioned on the top surface of the motor case;

an extension that protrudes downward from a bottom surface of the upper layer and covers at least a portion of the outer surface of the motor body; and fasteners that protrude downward from a bottom surface of the upper layer and are positioned to be inserted into the fastening holes.

5. The liquid dispenser of claim 4, wherein a retention hole having a smaller diameter than a diameter of the extension is formed through a top surface of the upper layer of the stirring motor cap.

6. The liquid dispenser of claim 4, wherein retention ribs protruding inward are formed on an inner surface of the extension, and the retention ribs are each formed in an annular ring shape extending from the inner surface of the extension.

7. The liquid dispenser of claim 6, wherein the retention ribs protrude inward and upward at an angle from the inner surface of the extension.

8. The liquid dispenser of claim 4, wherein each of the fasteners includes:

a body that protrudes downward from the bottom of the an upper layer;

an annular flange that circularly protrudes at a middle portion of the body; and an inclined step that is circumferentially formed and inclined upward at a predetermined position from a lower end of the body.

9. The liquid dispenser of claim 8, wherein when the fasteners are inserted into the fastening holes, a portion of the bodies between the annular ring and the inclined step is locked in the fastening hole by the annular ring and the inclined step.

10. The liquid dispenser of claim 1, wherein the separator includes:

a bottom layer that is horizontally formed and has a center hole through which the stirring head is inserted;

a first extension that extends upward from an edge of the center hole; and a plurality of separation walls that extend upward from an upper surface of the bottom layer and are positioned around the center hole.

\* \* \* \* \*